(12) United States Patent
Boakye et al.

(10) Patent No.: US 6,175,576 B1
(45) Date of Patent: Jan. 16, 2001

(54) SIGNALING CAPABLE TELECOMMUNICATION SYSTEM AND METHOD

(75) Inventors: Kwame Boakye, Clearwater, FL (US); Khashayar Mohammadi, Wayside, NJ (US)

(73) Assignee: Paradyne Corporation, Largo, FL (US)

( * ) Notice: Under 35 U.S.C. 154(b), the term of this patent shall be extended for 0 days.

(21) Appl. No.: 08/953,257

(22) Filed: Oct. 17, 1997

Related U.S. Application Data

(60) Provisional application No. 60/049,318, filed on Jun. 11, 1997.

(51) Int. Cl.[7] ................................................. H04J 3/12
(52) U.S. Cl. ............................................................ 370/524
(58) Field of Search ................................... 370/352–356, 370/389, 524

(56) References Cited

U.S. PATENT DOCUMENTS

| | | | |
|---|---|---|---|
| 4,000,371 | * 12/1976 | Oigawa | 358/261.1 |
| 5,247,571 | * 9/1993 | Kay et al. | 379/207 |
| 5,398,246 | * 3/1995 | Fujioka | 370/420 |
| 5,490,209 | * 2/1996 | Kennedy | 379/97 |
| 5,608,786 | * 3/1997 | Gordon | 370/352 |
| 5,748,628 | * 5/1998 | Ericson et al. | 370/384 |
| 5,923,659 | * 7/1999 | Curry et al. | 370/401 |
| 5,963,622 | * 10/1999 | Walsh | 379/93.33 |
| 5,978,672 | * 11/1999 | Hartmaier et al. | 455/413 |

\* cited by examiner

Primary Examiner—Huy D. Vu
Assistant Examiner—Jasper Kwoh

(57) ABSTRACT

An effective communications system for assuring compatibility between new and existing networking technologies is described which may be utilized to prevent the use of trial and error techniques in the establishing of the best possible connection between a calling terminal or modem and a destination terminal or modem. An enhanced services platform is provided which establishes the connection based on the signaling capabilities of both the calling and destination terminal, provides for in-call modification, and provides for call teardown.

24 Claims, 5 Drawing Sheets

TO FIG. 3B

SIGNALING CAPABLE TELECOMMUNICATION SYSTEM AND METHOD

This application claims priority to and the benefit of the filing date of U.S. provisional application entitled "A Signaling Capable Telecommunication System and Method," filed Jun. 11, 1997, and accorded Ser. No. 60/049,318.

BACKGROUND OF THE INVENTION

1. Field of the Invention

The present invention relates generally to communications systems using modems, and more specifically, to signaling capable modems and telecommunication systems that promote compatibility in new and existing networking technologies.

2. Description of Related Art

With advancements in communications technology, multimedia and telecommunication services have become more prevalent in our industry. The emergence of multimedia in the marketplace, coupled with the adoption and increasing implementation of new networking technologies such as integrated services digital network (ISDN), frame relay (FR) network, broadband ISDN and the Internet has brought to the attention of network designers certain practical communication compatibility issues associated with the integration and coexistence of these new networks with the standard 'telephony' network, also known as plain old telephone service (POTS) or public switched telephone network (PSTN). Furthermore, the advances in voiceband modem, or standard non-signaling modem, technology has made their capability suitable for many multimedia applications.

Modem technology also benefits when a universal service is available that has made its use ubiquitous and easy. The implementation of a universal service allows for the advancement of such technology at a faster rate. Therefore, there is a need for interworking between the new (e.g., ISDN, FR, the Internet) and the existing (e.g., voiceband modems, POTS) networking technologies.

One major compatibility issue relates to the diverse types of calls that a caller using multimedia terminal devices can initiate to a called party whose subscriber line characteristics and terminal device media support capabilities are unknown. For example, when a caller using an ISDN compliant multimedia service wants to communicate with a called party whose access line arrangement and terminal device media support capabilities are unknown, the caller can start a call based on the lowest common denominator capability and after the connection, establish the higher available capabilities, acquiring a higher capacity channel. Such requirements from the terminal devices can often be too demanding, since the terminals need to have a number of standard technological capabilities. This problem is exacerbated as the number of communication standards grows. On the other hand, if the call is initiated using a higher capability by the calling terminal than can be recognized by the called terminal, the called terminal may not be able to respond and establish an intelligible communication link. This turn of events leads to a loss of time in the user utilizing trial and error techniques until call establishment is acknowledged by the called terminal, if acknowledged at all.

In addition to the above-mentioned concerns with call initiations, other concerns exist for call modification. During a call, sometimes it is necessary to modify the nature of the connection or application that is using the connection, such as when a user changes a normal telephone call to a conference call in which the capacity of the channel being used must be expanded. This problem has been addressed in the ISDN environment, which implements signaling to tell when modification is necessary. Unfortunately, current PSTN modem equipment is unable to implement this capability.

SUMMARY OF THE INVENTION

The present invention provides an effective communication system for assuring compatibility between new and existing networking technologies, thereby providing a universal service and alleviating trial and error techniques.

According to the invention, a signaling capable modem is first defined. The signaling capability uses an out-of-band signaling channel and a Q.931 message set in a manner similar to ISDN terminals. This signaling channel could be implemented as a virtual circuit (VC) or a sub-channel using time division multiplexing (TDM). The invention also includes an inter-working/conferencing platform, which in the preferred embodiment is implemented by software and which is referred to as an enhanced services platform (ASP). The ESP enables interoperability between called and calling terminals. This interoperability exists among these modems as well as with other signaling capable devices and terminals (voice, data, video, image, etc.).

In accordance with the invention, all terminals start their call setup procedure by calling the ESP which has a designated number. The ESP then performs a series of tests and comparisons between the called terminal and previously stored, default values located in the ESP's memory. Based upon the calling modem, or terminal's signaling capability and type, and the called modem's or called terminal's signaling capabilities, the ESP establishes the best possible connection between the modem or terminal requesting the call and the modem or terminal receiving the call.

The ESP also provides for the testing of whether the closest bearer capability between the calling terminal and the receiving terminal is null, or disconnected, upon which detection of disconnection will provide for the termination of the call and a lack of disconnection will provide completion of the call.

To accomplish the above tasks, the ESP should have the following functional capabilities and features. The ESP should know the bandwidth and application capability of each terminal, whether that terminal supports voice, data, video, image, or some other means for communication. This is done by the ESP setting up a table in memory after negotiating and interrogating the capabilities and requests of each terminal. The ESP should identify the communication application based on a table for some terminals. Default entries for telephones and standard modems may also be stored in the table located in memory.

Each terminal can also request to teardown the call whereby the ESP will perform the teardown. The ESP can also recognize circuit teardown, an example being the loss of a carrier, and then de-establish a connection. After is call teardown, the ESP reconfigures the application table since the highest common denominator might have changed to a higher level or the lowest common denominator might not exist anymore. The ESP then notifies other links of the dropped party. Finally, if there is only one terminal connected to the ESP, the ESP clears all calls and the call table.

The ESP also provides for in-call modification of any previously established call to a destination terminal via the ESP. Such a modification would be characteristic of a change in the needed capacity of an established connection to a destination terminal due to the nature of the newly requested application, an example being a request to establish a conference call while on a normal telephone call.

Features of the invention include a dependable solution to a lack of compatibility between new and existing networking technologies. Maximum support capability is made available without the use of trial and error techniques. Active modification of channel capacity is provided to allow for multiple tasks simultaneously and the changing of functions without a need for the opening of a new channel, or re-dialing, for different channel capacities. The invention also allows for multiple connections to single or multiple destinations. This allows for the best available communication quality based on a lowest common denominator.

BRIEF DESCRIPTION OF THE DRAWINGS

Other features and benefits of the invention will be more clearly understood with reference to the specification and the accompanying drawings in which.

DETAILED DESCRIPTION OF THE PREFERRED EMBODIMENT

Figure 1:
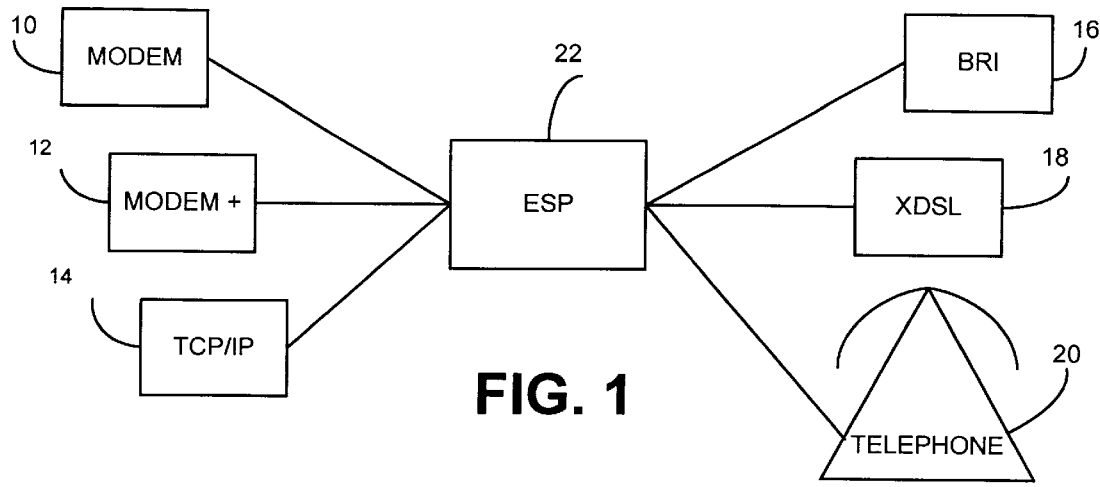
FIG. 1 is a block diagram of applications that may connect through a network to an ESP.
Figure 2:
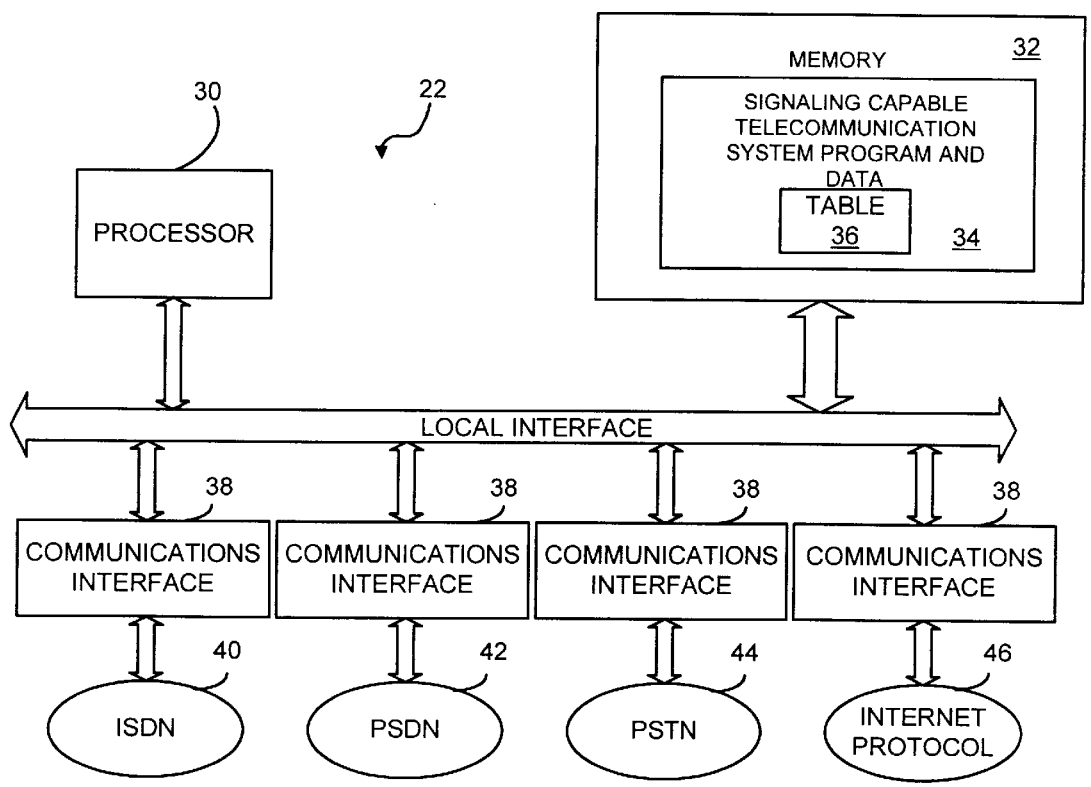
FIG. 2 is an illustrative diagram showing the major component interconnections in a system for implementing the present invention.

FIG. 1 is a high level, block diagram illustrating a possible architecture of a signaling capable telecommunication system according to the present invention. The telecommunication system comprises an enhanced service provider (ESP) 22 terminating a plurality of customer terminals. In the preferred embodiment, ESP 22 is capable of terminating customer terminals over a variety of communication links and protocols. For example, terminals may access the ESP via a non-signaling capable modem 10, a signaling capable modem 12, a link running TCP/IP 14, a basic rate ISDN (BRI) line 16, a digital subscriber line service (xDSL; hybrid rate, symmetric, asymmetric, etc.) 18, or a traditional telephone 20. FIG. 2 illustrates the components of ESP 22 in greater detail.

As shown in FIG. 2, ESP 22 includes a processor 30 in communication with a memory device 32 via a local interface. Memory device 32 holds the software program and data for the signaling capable telecommunication system 34. In addition, processor 30 has access to a plurality of communications interface devices 38 that terminate the customer terminals discussed hereinbefore in reference to FIG. 1. The hardware and software architecture of communications interface 38 will vary depending on the type of line and/or protocol being terminated. In the example shown, separate communications interface modules 38 are used to terminate terminals accessing ESP 22 over an ISDN 40, a public switched data network (PSDN) 42, a PSTN 44 or via an Internet protocol based network (IP) 46.

Operation of the preferred embodiment is described hereafter. Referring to FIG. 1, a non-signaling modem 10 calls an ESP 22 through a network that supports the non-signaling modem. Other terminals are also supported by the ESP 22 by connecting through networks which support the terminals. Examples of such terminals are a modem capable of signaling 12, a device which utilizes a transmission control protocol/internet protocol (TCP/IP) 14, a device using a BRI 16, a device using xDSL 18, or a telephone 20.

Referring to FIG. 2, the ESP 22 according to the present invention is illustrated. In the preferred embodiment, the ESP stores default entries in a table 36 located in memory 32 containing a software program and data for the signaling capable telecommunications system 34. These default entries may be programmed by a user to show the capabilities of telephones 20, standard modems 10, or any other telecommunication mechanism that may have standard operational values. In this illustration a standard modem is a modem without signaling capability.

After an ESP customer makes a call to the ESP 22, a processor 30 reads the maximum bandwidth and application capability of each terminal, whether the application be voice, data, video, image, or another application, through a communications interface 38 and stores the maximum communication capabilities in the table 36. As is shown in FIG. 2, different communication interfaces 38 may be utilized for different networks such as a PSDN 40, an IP based network 44, a PSTN 42, or an ISDN.

Figure 3A:
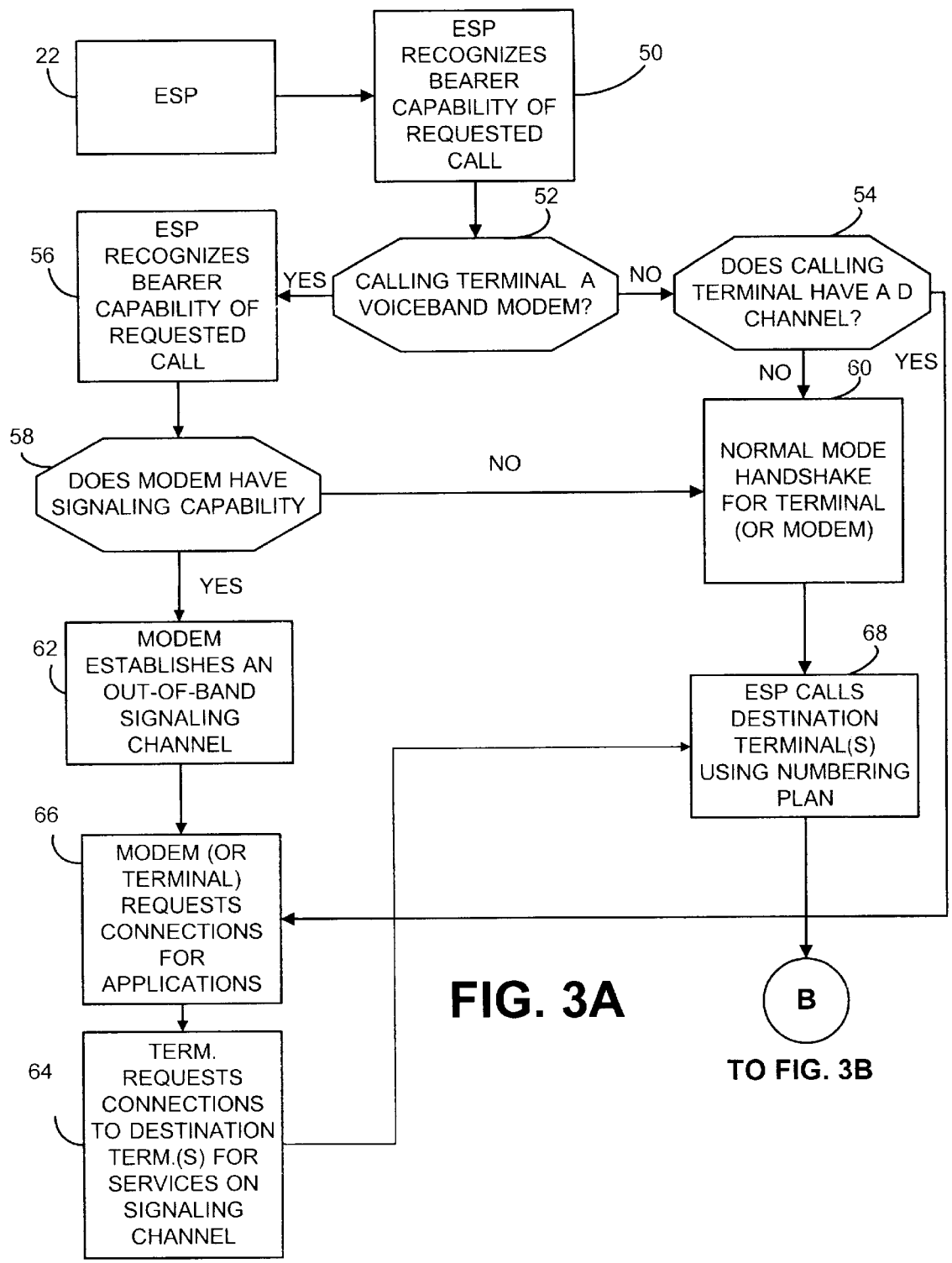
FIGS. 3A and 3B are flowcharts illustrating call establishment in the preferred embodiment of the present invention.

Referring to FIG. 3A, a flow diagram representing call establishment according to the preferred embodiment of the current signaling capable telecommunication system is shown. A call is made by a terminal to the designated ESP 22 through a network. Once the call is received the ESP 22 recognizes the bearer capability of the requested call 50. The bearer capability describes the communication capability of the channel being used to call the ESP 22. Thus, if a channel is being established for a voice transmission, the bearer capability is a voice channel. Similarly, if a channel is being established for a video transmission, the bearer capability is a video channel. The ESP 22 then compares the bearer capability of the requested call 50 to the default values in the table 36 (FIG. 2), thereby checking for deviation. In the preferred embodiment, the default values in the table 36 (FIG. 2) are the default values for a voiceband modem, which is a normal, non-signaling modem, or a telephone 20. The ESP 22 then checks whether the calling terminal is a voiceband modem 52. When the calling terminal is a voiceband modem the ESP 22 recognizes the bearer capability of the requested call. The calling modem is then checked for signaling capability 58. If such capability is present, the modem establishes an out-of-band signaling channel 62 which provides for the continuous supervision of the connection, during the life of the connection. Alternate embodiments may implement the out-of-band signaling channel as a Virtual Circuit or a sub-channel using time division multiplexing (TDM). After establishment of the out-of-band signaling channel 62 the modem or terminal requests connections for the applications relevant to the modem or terminal call 66. These applications are directly related to the type of modem or terminal that is being used, an example being a fax transmission for a fax modem. Finally, the modem or terminal requests connections, via the out-of-band signaling channel, to the destination terminal(s) for a set of services 64. In the preferred embodiment the set of services pertain to the specific parameters needed to perform an application at the highest quality level.

When the calling modem does not have signaling capability a normal mode handshake is applied between the ESP 22 and terminal or modem 60. This modem or terminal could support voice, data, video or any of numerous communication means.

The ESP 22 then calls a destination terminal or modem using a numbering plan 68 such as E.163 or E.164. Completion of this call leads to further establishment of the requested call based upon the called terminal's capabilities as is further discussed in the detailed description of FIG. 3B.

If, as previously checked, the calling terminal is not a voiceband modem, the calling terminal is tested for the presence of a D-channel 54. Where a D-channel exists the modem or terminal requests connections for the applications that are to be implemented by the terminal 66. The terminal then requests connections to destination terminal(s) for the set of services on the signaling channel 64. If, however, the calling terminal does not have a D-channel, a normal mode handshake is applied between the ESP 22 and the calling terminal or modem 60. Once again, the calling modem or terminal could support voice, data, video or any of numerous combinations of these or other applications. The ESP 22 then calls a destination terminal or modem using a numbering plan 68 such as E.163 or E.164. Further steps for completion of the established call are discussed in the detailed description of FIG. 3B.

Figure 3B:
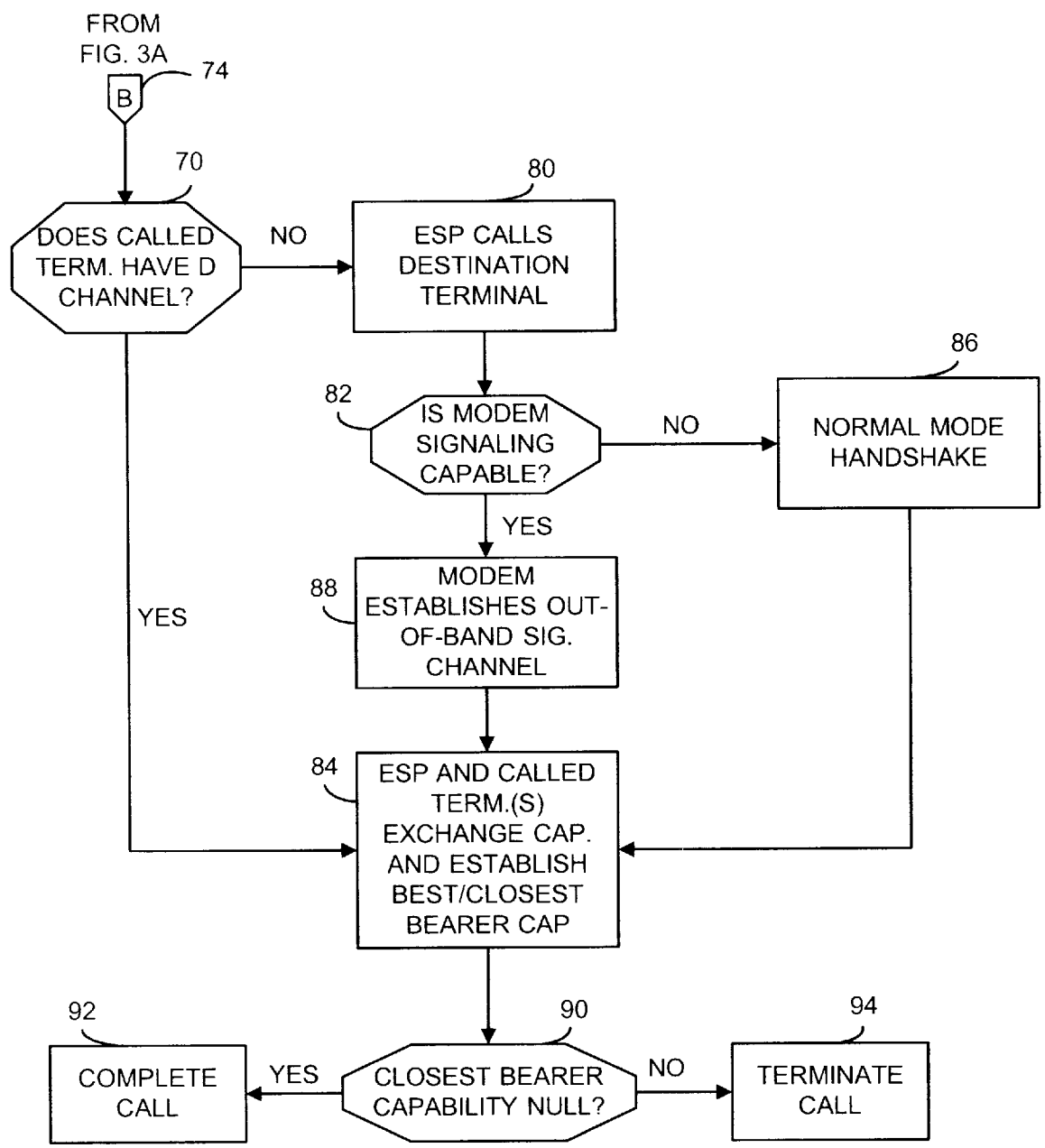

Referring to FIG. 3B, a flow diagram representing call establishment according to the preferred embodiment of the current signaling capable telecommunication system and continuing from FIG. 3A, is shown. The ESP 22 then checks the destination terminal for D-channel signaling capability 70. If the destination terminal has D-channel signaling capability the ESP 22 exchanges the previously stored maximum capabilities from the table 36 (FIG. 2) in the memory 32 (FIG. 2) of the signaling capable telecommunications system, with the capabilities of the destination terminal to establish a best/closest bearer 84. In the preferred embodiment the standard used to control the signaling is Q.931. The Q.931 standard defines a protocol that performs such services as routing of chosen numbers and knowledge of whether the destination is not reached or the called line is busy. The ISDN recommendation Q.931 is implemented as a server that is reached through a socket interface. This makes it possible to connect to the ISDN server from any host over a data network, such as TCP/IP network.

At this point a call has not been established; only a D-channel check has been performed, and that does not necessarily require that the call be established. If, however the destination terminal does not have D-channel signaling capability, the ESP calls the destination terminal 80 and checks for signaling capability 82. If the modem is signaling capable, the terminal establishes an out-of-band signaling channel 88. The ESP and destination terminal then exchange capabilities and establish the bearer at the best/closest rate 84. If, however, the destination terminal does not have signaling capability a normal mode handshake is used 86 between the destination modem and ESP 22. After a normal mode handshake is established for the non-signaling capable modem 86 the ESP and destination terminal exchange capabilities and establish the best/closest bearer capability 84. A further check is made by the ESP 22 as to whether the closest bearer capability is null 90, or has been disconnected. If the closest bearer capability is null the call is terminated 94. Otherwise, the ESP, calling modem and the destination modem communicate through the previously established channel 92.

Figure 4:
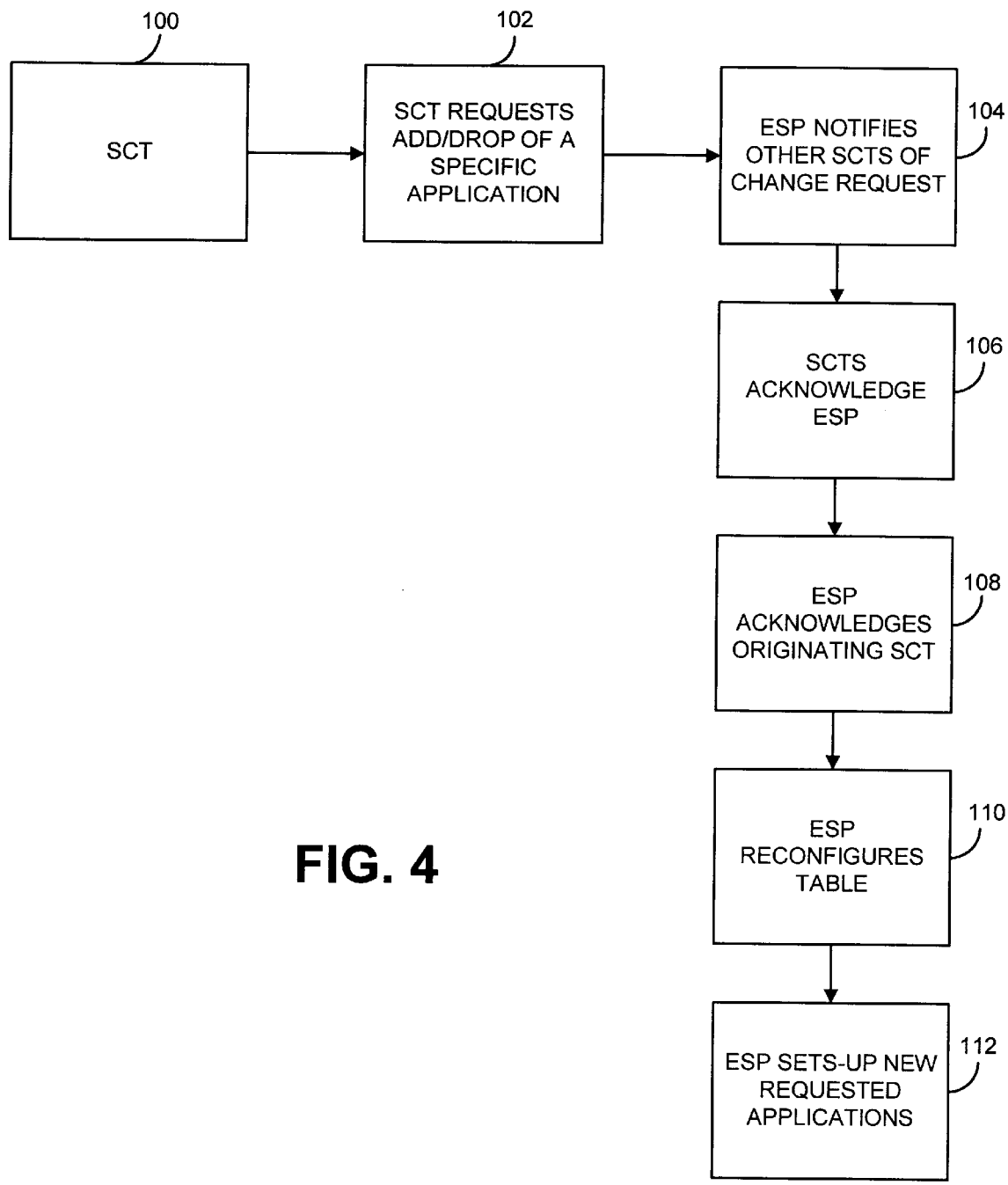
FIG. 4 is a flowchart illustrating in-call modification in the preferred embodiment of the present invention.

Referring now to FIG. 4, after a call has been established through the previously established channel, as has been discussed in the aforementioned detailed descriptions of FIGS. 3A and 3B, in-call modification is provided for. In the illustrative embodiment, in-call modification is permitted for any signaling capable terminal 100 (SCT), an example being a modem capable of signaling. The terminal requests to add or drop a specific application activation 102, which was previously activated during call establishment 66 (FIG. 3A). Examples of when this sequence would be necessary would be when a request is made to fax a document while on a conference call or when a user changes a normal telephone call to a conference call, in which the capacity of the channel being used must be expanded. The ESP 22 notifies the SCT of the change request 104 by the terminal, at which point the SCT acknowledges the ESP 106. The ESP 22 then reconfigures the table 110 in memory 32 (FIG. 2). Finally, the ESP 22 sets-up or deactivates the newly requested applications 112 from the terminal.

Figure 5:
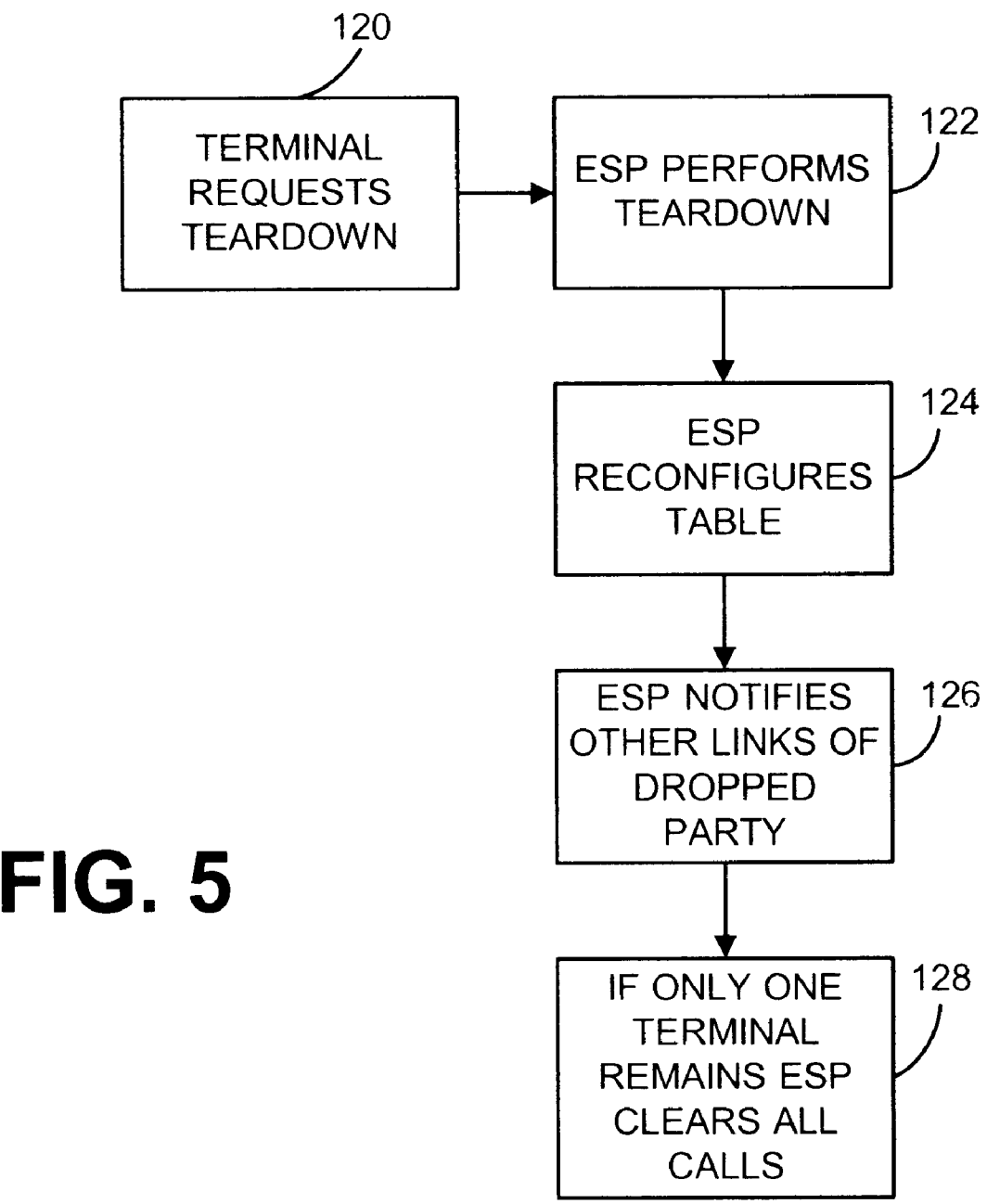
FIG. 5 is a flowchart illustrating call teardown in the preferred embodiment of the present invention.

In reference to FIG. 5, a call teardown option is provided so each terminal may request to teardown the previously established call. Call teardown is achieved by the ESP 22 after a request has been received from a terminal 120. Call teardown, such as the loss of a carrier, can also be recognized by the ESP 22, at which point the ESP will de-establish the corresponding connection. After teardown the ESP 22 reconfigures the application table 124. By this process, if the lowest common denominator between applications is removed, the application table will adjust the remaining applications accordingly to show a higher, lowest common denominator between the running applications. After adjustment, the ESP 22 notifies the other links of the dropped party 126. Finally, if only one terminal remains, the ESP 22 (FIG. 1) clears all calls from the table 128.

Although the illustrative embodiment described hereinabove implements a virtual circuit to establish the out-of-band signaling channel, one of ordinary skill in the art will appreciate that other circuits having similar signaling capabilities such as dedicated time division multiplexed bandwidth, may be substituted.

Although the invention has been shown and described with respect to exemplary embodiments thereof, various other changes, omissions and additions in form and detail thereof may be made therein without departing from the spirit and scope of the invention.

The following is claimed:

1. A method for facilitating communication among signaling capable telecommunication systems through an enhanced service platform (ESP) having a designated number, the method comprising the steps of:

communicating between an ESP and an ESP customer terminal;

determining whether said ESP customer terminal has voiceband and signaling capabilities;

establishing a handshake between said ESP and said ESP customer terminal when said ESP customer terminal is a voiceband modem and does not have signaling capability;

establishing a handshake between said ESP and said ESP customer terminal when said ESP customer terminal is not a voiceband modem and does not have a D-channel;

communicating between said ESP and a destination terminal;

determining whether said destination terminal has a D-channel and is signaling capable;

establishing a handshake between said ESP and said destination terminal when said destination terminal does not have a D-channel and does not have signaling capability;

establishing an out-of-band signaling channel when said destination terminal does not have a D-channel and has signaling capability; and establishing a highest rate channel between said ESP customer terminal and said destination terminal based upon a correlation of said capabilities, through said channel.

2. The method of claim 1, further comprising the step of:
modifying said highest rate channel to accommodate a request for an in-call modification by a first signaling capable terminal (SCT).

3. The method of claim 2, wherein the step of modifying said highest rate channel is further defined by the steps of:
requesting the addition or dropping of a specific application being performed by said SCT;
notifying a second SCT of said request;
acknowledging of said ESP by said second SCT;
acknowledging of said first SCT by said ESP;
reconfiguring a table in the memory of said ESP; and
establishing said request.

4. The method of claim 1, further comprising the step of:
tearing down said highest rate channel upon a request by said at least one ESP customer terminal.

5. The method of claim 4, wherein said tearing-down is further defined by the steps of:
requesting said tearing down by said at least one ESP customer terminal;
performing of said tearing down by said ESP; and
reconfiguring a table in the memory of said ESP.

6. The method of claim 1, further comprising the step of checking whether said highest rate channel is null.

7. The method of claim 1, wherein said out-of-band signaling channel is controlled by a Q.931 standard.

8. The method of claim 1, wherein said out-of-band signaling channel is implemented as a virtual circuit.

9. The method of claim 1, wherein said out-of-band signaling channel is implemented as a sub-channel using time division multiplexing.

10. The method of claim 1, wherein said ESP customer terminal is at least one ESP customer modem and said destination terminal is a destination modem.

11. The method of claim 1, wherein said ESP customer terminal and said destination terminal support the transmission of voice.

12. The method of claim 1, wherein said ESP customer terminal and said destination terminal support the transmission of data.

13. The method of claim 1, wherein said ESP customer terminal and said destination terminal support the transmission of video.

14. A method for effecting compatibility in signaling capable telecommunication systems comprising the steps of:
(a) establishing a call by calling an Enhanced Service Provider (ESP), wherein said ESP has a designated number, said ESP performing the following steps:
(1) checking whether said call is from a voiceband modem;
(2) checking said voiceband modem for signaling capability; and
(3) calling a destination terminal,
wherein, when said call is from a voiceband modem, said ESP determines the bearer capability of said call,
(b) in response to said voiceband modem having signaling capability, said method further comprising the steps of:
(1) said voiceband modem establishing an out of band signaling channel;
(2) requesting at least one connection for at least one application performed by said voiceband modem; and
(3) said voiceband modem requesting connection to said destination terminal for a set of services on said out of band signaling channel,
(c) in response to said voiceband modem not having signaling capability, said method further comprising the step of performing a handshake between said voiceband modem and said ESP platform,
(d) in response to said step of calling said destination terminal, said method further comprising the step of checking said destination terminal for D-channel signaling capability, wherein if said destination terminal has D-channel signaling capability said ESP and said destination terminal exchange capabilities and establish a best/closest bearer, and if said destination terminal does not have D-channel signaling capability said ESP and said destination terminal establish a bearer at a highest rate.

15. A method for effecting compatibility in telecommunication systems comprising the steps of:
(A) receiving a call at an Enhanced Service Provider (ESP),
(B) checking, by the ESP, whether the call is from a voiceband modem:
(1) if the call is from a voiceband modem, determining, by the ESP, bearer capability of the call; and
(2) checking, by the ESP, the voiceband modem for signaling capability; and
(i) if the voiceband modem has signaling capability:
(a) facilitating establishment of an out of band signaling channel by the voiceband modem;
(b) facilitating a request for connection, by the voiceband modem, to a destination terminal for a set of services on the out of band signaling channel,
(ii) if the voiceband modem does not have signaling capability:
performing a handshake between the voiceband modem and the ESP;
(C) calling a destination terminal;
(D) checking the destination terminal for D-channel signaling capability;
(1) if the destination terminal has D-channel signaling capability:
(i) exchanging capabilities between the ESP and the destination terminal; and
(ii) establishing a best/closest bearer between the ESP and the destination terminal; and
(2) if the destination terminal does not have D-channel signaling capability:
establishing a bearer between the ESP and the destination terminal at a highest rate.

16. The method of claim 15, further comprising the step of:
modifying the highest rate to accommodate a request for an in-call modification by a first signaling capable terminal (SCT).

17. The method of claim 15, further comprising the step of:
tearing down the highest rate upon receiving a request from the voiceband modem.

18. The method of claim 16, wherein the step of modifying the highest rate comprises the steps of:
receiving a request for adding or dropping of a specific application being performed by the SCT;
notifying a second SCT of the request;

acknowledging of the ESP by the second SCT;
acknowledging of the first SCT by the ESP;
reconfiguring a table in the memory of the ESP; and
establishing the request.

19. The method of claim 17, wherein the step of tearing down comprises the steps of:
receiving a request for the tearing down from the voiceband modem;
performing the tearing down by the ESP; and
reconfiguring a table in the memory of the ESP.

20. A telecommunication system for effecting compatibility between a customer terminal and a destination terminal, said system comprising:
means for receiving a call from a customer terminal;
means for checking whether the customer terminal is a voiceband modem such that, if the call is from a voiceband modem, said means for checking whether the call is from a voiceband modem being configured to determine bearer capability of the call;
means for determining whether the voiceband modem has signaling capability;
means for facilitating establishment of an out of band signaling channel by the voiceband modem;
means for facilitating a request for connection, by the voiceband modem, to a destination terminal for a set of services on the out of band signaling channel, means for performing a handshake with the voiceband modem;
means for calling the destination terminal;
means for checking the destination terminal for D-channel signaling capability;
means for establishing a best/closest bearer with the destination terminal if the destination terminal has D-channel signaling capability; and
means for establishing a bearer with the destination terminal at a highest rate if the destination terminal does not have D-channel signaling capability.

21. The system of claim 20, further comprising:
means for modifying the highest rate to accommodate a request for an in-call modification by a first signaling capable terminal (SCT).

22. The system of claim 21, further comprising:
means for tearing down the highest rate upon receiving a request by the customer terminal.

23. A telecommunication system for effecting compatibility between a customer terminal and a destination terminal, said system comprising:
a processor configured to communicate with the customer terminal; and
a memory device communicating with said processor, said memory device being configured to store a program of instructions executable by said processor for effecting compatibility between the customer terminal and the destination terminal;
said program of instructions comprising:
a first logic segment configured to check whether the customer terminal is a voiceband modem such that, if the customer terminal is a voiceband modem, the first logic segment being configured to determine bearer capability of a call from the voiceband modem;
a second logic segment configured to determine whether the voiceband modem has signaling capability;
a third logic segment configured to facilitate establishment of an out of band signaling channel by the voiceband modem;
a fourth logic segment configured to facilitate a request for connection, by the voiceband modem, to a destination terminal for a set of services on the out of band signaling channel,
a fifth logic segment configured to facilitate a handshake with the voiceband modem;
a sixth logic segment configured to facilitate a call to the destination terminal;
a seventh logic segment configured to check the destination terminal for D-channel signaling capability;
an eighth logic segment configured to facilitate establishment of a best/closest bearer with the destination terminal if the destination terminal has D-channel signaling capability; and
a ninth logic segment configured to facilitate establishment of a bearer with the destination terminal at a highest rate if the destination terminal does not have D-channel signaling capability.

24. A program storage medium readable by a computer and tangibly embodying a program of instructions executable by the computer for effecting compatibility between a customer terminal and a destination terminal in a telecommunications network, said program storage medium comprising:
a first logic segment configured to check whether the customer terminal is a voiceband modem such that, if the customer terminal is a voiceband modem, the first logic segment being configured to determine bearer capability of a call from the voiceband modem;
a second logic segment configured to determine whether the voiceband modem has signaling capability;
a third logic segment configured to facilitate establishment of an out of band signaling channel by the voiceband modem;
a fourth logic segment configured to facilitate a request for connection, by the voiceband modem, to a destination terminal for a set of services on the out of band signaling channel,
a fifth logic segment configured to facilitate a handshake with the voiceband modem;
a sixth logic segment configured to facilitate a call to the destination terminal;
a seventh logic segment configured to check the destination terminal for D-channel signaling capability;
an eighth logic segment configured to facilitate establishment of a best/closest bearer with the destination terminal if the destination terminal has D-channel signaling capability; and
a ninth logic segment configured to facilitate establishment of a bearer with the destination terminal at a highest rate if the destination terminal does not have D-channel signaling capability.

* * * * *

UNITED STATES PATENT AND TRADEMARK OFFICE
CERTIFICATE OF CORRECTION

PATENT NO. : 6,175,576 B1
DATED : January 16, 2001
INVENTOR(S) : Boakye et al.

It is certified that error appears in the above-identified patent and that said Letters Patent is hereby corrected as shown below:

Column 2, line 21, delete "(ASP)" and insert --(ESP)--.

Column 2, line 57, delete "is".

Column 4, line 23, delete "40" and insert --42--.

Column 4, line 24, delete "44" and insert --46--.

Column 4, line 24, delete "42" and insert --44--.

Column 4, line 24, after "ISDN" insert --40--.

Signed and Sealed this

Twenty-ninth Day of May, 2001

Attest:

NICHOLAS P. GODICI

*Attesting Officer*     *Acting Director of the United States Patent and Trademark Office*